United States Patent
Koppaka et al.

(10) Patent No.: US 11,681,653 B2
(45) Date of Patent: Jun. 20, 2023

(54) NAMESPACE REPRESENTATION AND ENHANCED BROWSABILITY FOR REPLICATED FILE SYSTEMS

(71) Applicant: EMC IP Holding Company LLC, Hopkinton, MA (US)

(72) Inventors: Sri Koppaka, San Jose, CA (US); Evgeny Popovich, Port Coquitlam (CA); Vishal Sahu, Bothell, WA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 479 days.

(21) Appl. No.: 16/905,256

(22) Filed: Jun. 18, 2020

(65) Prior Publication Data
US 2021/0397583 A1    Dec. 23, 2021

(51) Int. Cl.
*G06F 16/14* (2019.01)
*G06F 16/16* (2019.01)
*G06F 16/188* (2019.01)
*G06F 21/62* (2013.01)
*G06F 21/00* (2013.01)

(52) U.S. Cl.
CPC .......... *G06F 16/152* (2019.01); *G06F 16/164* (2019.01); *G06F 16/188* (2019.01); *G06F 21/6227* (2013.01)

(58) Field of Classification Search
None
See application file for complete search history.

(56) References Cited

U.S. PATENT DOCUMENTS

| | | | |
|---|---|---|---|
| 2014/0173080 A1* | 6/2014 | Dilmaghani | H04L 67/63 709/223 |
| 2015/0379426 A1* | 12/2015 | Steele | G06N 5/025 706/12 |

OTHER PUBLICATIONS

Nils Rodrigues. Oct. 31, 2013. Visualisation Research Center. Analyzing Textual Data by Multiple Word Clouds.*
Fielding, et al. "Hypertext Transfer Protocol—HTTP/1.1: 14 Header Field Definitions" https://www.w3.org/Protocols/rfc2616/rrc2616-sec14.html, Last Accessed Feb. 2, 2023, 35 pages.

* cited by examiner

*Primary Examiner* — Tuankhanh D Phan
(74) *Attorney, Agent, or Firm* — Amin, Turocy & Watson, LLP (57) ABSTRACT

Systems and methods facilitating namespace representation and enhanced browsability for replicated file systems are described herein. A method as described herein can include computing, by a device operatively coupled to a processor, a first length of a first object key for a first data object, wherein the first object key comprises a directory path associated with the first data object; in response to determining that the first length is larger than a threshold, creating, by the device, a second data object having a second object key that comprises a representation of the directory path associated with the first data object; and altering, by the device, the first object key in response to the creating the second data object, resulting in an altered first object key that comprises a reference to the second data object instead of the directory path associated with the first data object.

20 Claims, 10 Drawing Sheets

NAMESPACE REPRESENTATION AND ENHANCED BROWSABILITY FOR REPLICATED FILE SYSTEMS

TECHNICAL FIELD

The subject application is related to data storage, and more particularly, to techniques for organizing and presenting data in file and/or object storage systems.

BACKGROUND

In data storage systems, such as file storage systems and/or object storage systems, a data mover can be employed in software and/or hardware to transfer data between distinct devices and/or systems. For instance, a data mover can allow replication of a file system dataset to a cloud storage system and/or other suitable devices or systems.

In some implementations, a file system can be replicated in a "copy" format to a target system, e.g., a cloud storage system. For data replicated in such a format, it is desirable to maintain respective properties of the replicated file system, such as the following:

1) The file system should be browsable at the target system, e.g., using standard third-party tools.
2) Files replicated to the target system should be usable at the target system. In other words, the replicated files at the target system should provide unaltered content when read by third-party applications.
3) A replicated dataset, when copied from a target system back to the original storage system, should fully restore directory and file attributes, such as portable file system interface (POSIX) mode bits, access control lists (ACLs), file sparseness information, etc.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a path analysis component that determines a first length of a first object name associated with a first data object, the first object name including a directory path associated with the first data object. The executable components can further include a junction point component that, in response to determining that the first length is larger than a length threshold, generates a second data object with a second object name that includes a representation of the directory path associated with the first data object, where the second object name has a second length that is less than the first length. The executable components can additionally include a path reference component that alters the first object name in response to the junction point component generating the second data object, resulting in an altered first object name that includes a reference to the second data object instead of the directory path associated with the first data object.

In another aspect, a method is described herein. The method can include computing, by a device operatively coupled to a processor, a first length of a first object key for a first data object, where the first object key includes a directory path associated with the first data object. The method can further include, in response to determining that the first length is larger than a threshold, creating, by the device, a second data object having a second object key that includes a representation of the directory path associated with the first data object. The method can also include altering, by the device, the first object key in response to the creating the second data object, resulting in an altered first object key that includes a reference to the second data object instead of the directory path associated with the first data object.

In an additional aspect, a non-transitory machine-readable medium including computer executable instructions is described herein. The instructions, when executed by a processor of a data storage system, can facilitate performance of operations including computing a first length of a first name of a first object associated with the data storage system, where the first name comprises a directory path associated with the first object; in response to determining that the first length is larger than a threshold length, generating a second object, the second object having a second name that includes a representation of the directory path associated with the first object; and altering the first name of the first object in response to generating the second object, resulting in an altered first name that includes a reference to the second object instead of the directory path associated with the first object.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

As noted above, a data mover can be utilized to transfer datasets between different storage systems. As used herein, the term "dataset" refers to a collection of data (as stored in files, objects, or the like) that is designated for transferal between different locations. By way of example, a data mover can be used to transfer a dataset from a file storage system to another file storage system, an object storage system (e.g., a cloud storage system), and/or any other suitable location(s).

Various aspects described herein enhance the browsability of a replicated file system, e.g., a file system that is replicated to an object storage system, by preserving the file system namespace when replicated in addition to facilitating accessibility of the files of the replicated file system, e.g., via third-party tools or the like, using the same directory tree structure as that of the underlying file system. In an aspect, a file system replicated to an object repository can be made browsable by naming cloud objects that represent respective files after the full file system paths of those files. Additionally, respective names of said cloud objects can be given a prefix and/or other indication(s) that the cloud objects are 1-to-1 representations of the logical data of their respectively corresponding files.

In addition, various aspects described herein can be utilized to provide browsability of a replicated file system with virtually unlimited file system path lengths in object stores that restrict object names to a maximum object name length. As described below, various aspects herein can utilize specialized objects, referred to herein as "junction points," to unambiguously stitch two different namespaces, thereby enabling representation of arbitrarily long path names in an object storage system and keeping the file system as replicated to the object storage system fully browsable.

By implementing file system namespace representation as described herein, various advantages that can improve the functionality of a computing system can be realized. By way of example, various aspects as described herein can utilize an objective rules-based framework to enable seamless browsing of a replicated file system on an object storage system, such as a cloud storage system, that was previously not possible (e.g., due to object name length restrictions as described above). This, in turn, can improve performance associated with accessing and/or browsing a replicated file system, e.g., in terms of reduced network bandwidth usage, lower power consumption, reduced processor cycles and/or memory usage, etc. Other advantages are also possible.

Figure 1:
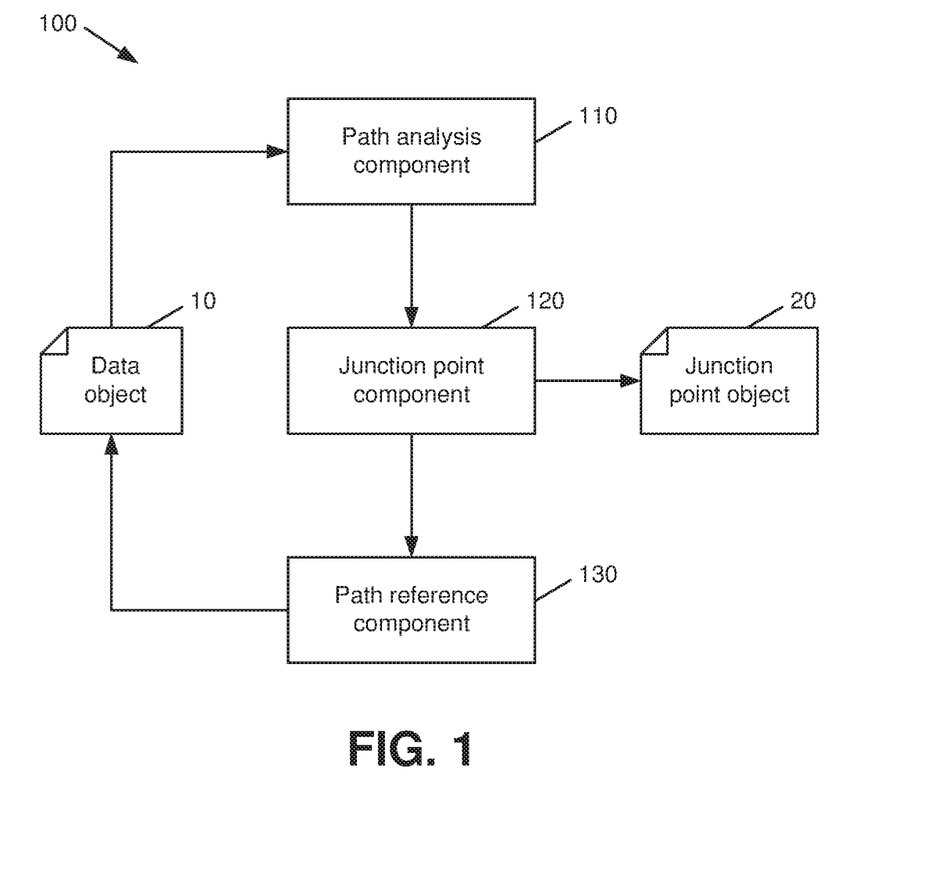
FIG. 1 is a block diagram of a system that facilitates namespace representation and enhanced browsability for replicated file systems in accordance with various aspects described herein.

With reference now to the drawings, FIG. 1 illustrates a block diagram of a system 100 that facilitates namespace representation and enhanced browsability for replicated file systems in accordance with various aspects described herein. As shown in FIG. 1, system 100 includes a path analysis component 110, a junction point component 120, and a path reference component 130, which can operate as described in further detail below. In an aspect, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 11.

In an aspect, the components 110, 120, 130 can be associated with a computing node and/or other computing device associated with a data storage system (e.g., a file storage system, an object storage system, etc.). Also or alternatively, the components 110, 120, 130 can be associated with a dedicated data mover device that facilitates movement of datasets between different data storage systems associated with the data mover device. In another aspect, the components 110, 120, 130, and/or other components as will be described in further detail below, can be implemented on a same computing device and/or distributed among multiple computing devices.

Returning to FIG. 1, the path analysis component 110 of system 100 can determine a length of an object name that is associated with a data object 10. In an aspect, the data object 10 can be an existing object associated with an object storage system and/or an object created from a file stored on a file storage system (e.g., for replication to an object storage system). As will be described in further detail below, the object name for the data object 10 can include a directory path associated with the data object 10, e.g., a directory path for a file corresponding to the data object 10 as stored on a file storage system.

In response to determining that the length of the object name associated with the data object 10 is longer than a length threshold, the junction point component 120 of system 100 as further shown in FIG. 1 can generate and/or otherwise provide a second data object, referred to herein as a junction point object 20. In an aspect, the junction point object 20 can be assigned an object name that includes a representation of the directory path associated with the data object 10. In another aspect, using the representation of the directory path in the object name for the junction point object 20 rather than the full directory path can result in the object name for the junction point object 20 being shorter than the object name originally assigned to the data object 10.

In some embodiments, the representation of the directory path can be a cryptographic hash of the directory path, e.g., a hash generated according to a secure hash algorithm (SHA) such as SHA-224, SHA-256, and/or any other suitable algorithm(s). Other types of representations could also be used, such as a numerical or other indicator (e.g., an index corresponding to an entry in a lookup table), and/or other representations.

As further shown by system 100 in FIG. 1, the path reference component 130 can alter the object name of the data object 10 as originally assigned in response to the junction point component 120 creating a junction point object 20 as described above. In an aspect, the altered name of the data object 10 as assigned by the path reference component 130 can include the representation of the directory path for the data object 10 as present in the name of the junction point object 20, rather than the full directory path. This can, in turn, result in a shorter object name for the data object 10 while preserving full browsability of the data object 10 and its underlying directory structure.

In an aspect, a data mover can be utilized to move a dataset between different systems, e.g., from a source system to a target system. In some cases, data structures and/or other properties of the source system can differ from those of the target system, e.g., in use cases associated with a transfer of a dataset between a file storage system (e.g., a network attached storage (NAS) system, etc.) and an object storage system (e.g., a cloud storage system).

As an example of the above, file storage systems can generally permit arbitrarily long path lengths. Additionally, a file storage system can provide a relatively high limit for the length of a filename component (e.g., between approximately 1000-1020 bytes in some file storage systems), while the number of components in a file path can be unrestricted by any well-defined limits. Conversely, object storage systems can impose limits on object name and path lengths through various properties of object storage systems such as the following:

1) An object storage system generally does not have a directory hierarchy. Instead, a flat bucket structure is used, similar to a single-level directory structure. An example of this structure is shown in Table 1 below.

TABLE 1

Bucket structure for an example object storage system.

Bucket1/Object1
/Object2
/Object3
Bucket2/Object4
/Object5

2) The number of buckets per account in an object storage system can be limited (e.g., to 1000 buckets per account, etc.).

3) Object name lengths within a bucket associated with an object storage system, e.g., the length of object1 or object2 as shown in Table 1 above, can similarly be limited (e.g., to 1024 bytes, etc.).

Figure 2:
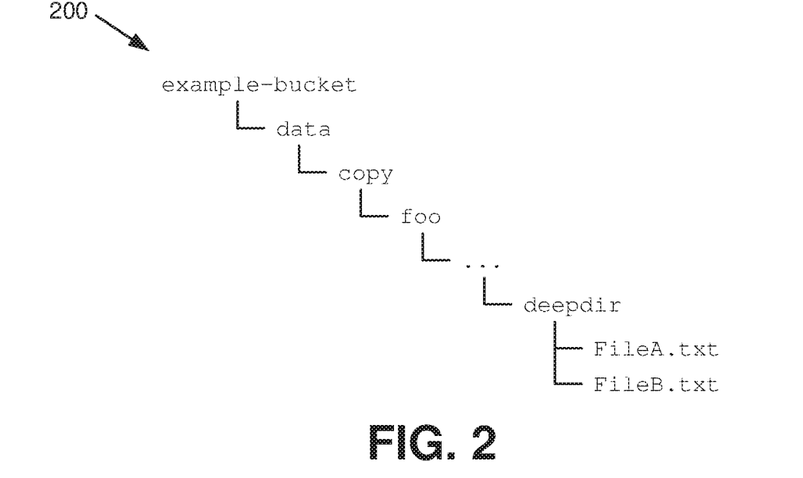
FIGS. 2-3 are respective diagrams depicting an example junction point object that can be created by the system of FIG. 1 in accordance with various aspects described herein.
Figure 3:
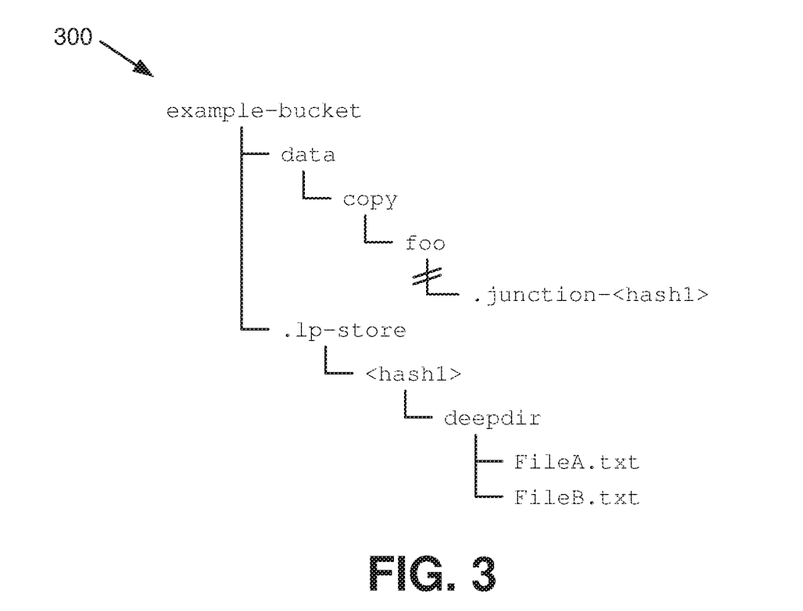

In view of the above, the junction point component 120 shown in FIG. 1 can represent file paths that include name components (e.g., directory and/or file names) and exceed a threshold length (e.g., 1024 bytes, etc.) using junction points, e.g., via junction point objects 20. A visual example of a junction point object that can be implemented for an example directory path is shown by FIGS. 2-3. With reference first to FIG. 2, diagram 200 illustrates an example directory structure before the use of junction points. While the directory path in diagram 200 is shown hierarchically, it should be appreciated that respective objects in the bucket example_bucket as shown in diagram 200 would be stored using a single-level structure, e.g., a structure similar to that given above in Table 1. Instead, the directory hierarchy can be preserved by assigning object names to respective objects in example_bucket that are based on their corresponding directory paths. Thus, for example, an object for directory copy as shown in diagram 200 can be named data/copy, an object for directory foo can be named data/copy/foo, and so on.

In an aspect, an object name (or object key) can be a sequence of Unicode characters whose UTF-8 encoding is limited by an object name length limit associated with the associated object storage system. By way of specific, non-limiting example, the object name length limit for the Amazon Web Services (AWS) S3 storage system is 1024 bytes. Other object storage providers could have different limits. In contrast, a file storage system can include files that are deep inside a directory hierarchy such that the overall path length exceeds the limit imposed by the object storage system. As used herein, the term "path name" refers to the full path of a particular file or directory from the copy root, e.g., the root directory associated with bucket example_bucket. Further, the term "filename" refers to a current file or directory name, which itself can be subject to separate length limits, e.g., as will be discussed in further detail with respect to FIG. 7.

Returning to FIG. 2, diagram 200 illustrates an example directory path that includes a directory deepdir that contains two files, FileA.txt and FileB.txt. In an aspect, an object corresponding to deepdir can originally be associated with a name (e.g., as analyzed by the path analysis component 110) of /data/copy/foo/ . . . /deepdir, where the ellipsis represents a directory path that causes the name for the deepdir object to exceed the length limit associated with the object store. In response to the length of the object name for the deepdir object exceeding this limit, the junction point component 120 can construct a junction point object 20 to trim the directory path associated with the deepdir object, as shown by diagram 300 in FIG. 3.

As diagram 300 illustrates, a junction point can be placed into the file system hierarchy to assist in redirecting to where a given target object is stored. As further shown in diagram 300, the junction point for the deepdir directory can be created in the format .junction-<hash(full_path)>, where .junction is a redirect indicator that identifies the object as a junction point and <hash(full_path)> is a hash of the full directory path (e.g., according to SHA-224, SHA-256, and/or other algorithms) For brevity, the hash of the full directory path associated with deepdir is illustrated in diagram 300 as <hash1>. Further for brevity, the directory hierarchy between the directory foo and the junction point is omitted in diagram 300, as indicated by a broken branch.

As further shown in diagram 300, once a junction point for deepdir has been created, the path reference component 130 can assign an object name to deepdir with reference to the redirect indicator. For instance, the object associated with deepdir can be given the name .lp-store/<hash1>/deepdir, where .lp-store is a long path store directory that serves as a target for junction point redirection. While junction point objects are illustrated in diagram 300 as redirecting to a single directory .lp-store, it should be appreciated that junction points could facilitate redirection to any directory hierarchy, containing one or multiple target directories, in any suitable manner.

In an aspect, a junction point as shown in diagram 300 can itself be structured as an object, e.g., as a junction point object 20 that is similar in structure to an underlying data object 10. The junction point object 20 can be an empty (null) object, or alternatively the junction point object 20 could be used to store any suitable data. In another aspect, the junction point object 20 can be assigned metadata and/or other indicators that identify it as a junction point, as will be described below with reference to FIG. 6.

As diagram 300 further illustrates, an underlying directory structure can continue through a junction point redirection in the same way as other directory paths. For instance, an object for FileA.txt in diagram 300 can be assigned a name that includes the hash associated with deepdir instead of the full directory path for deepdir. Thus, for instance, FileA.txt as shown in diagram 300 can be assigned a name of .lp-store/<hash1>/deepdir/FileA.txt. A directory path can continue in this manner for any number of directory components.

Figure 4:
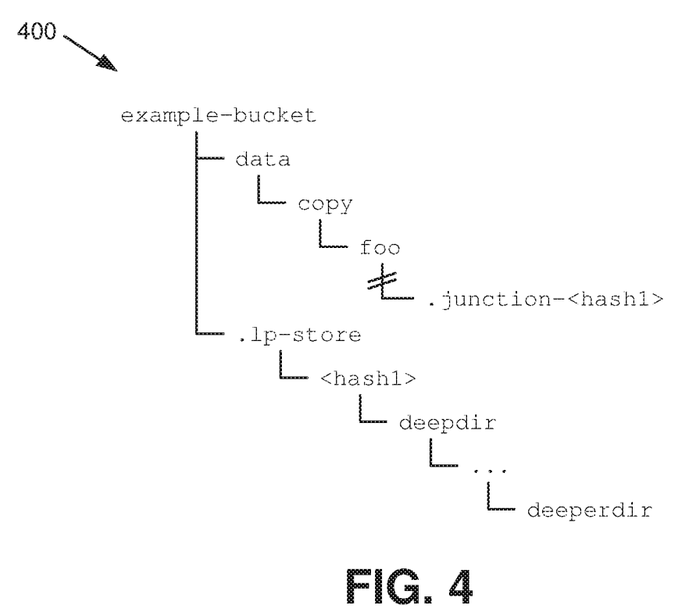
FIGS. 4-5 are respective diagrams depicting an example set of nested junction point objects that can be created by the system of FIG. 1 in accordance with various aspects described herein.
Figure 5:
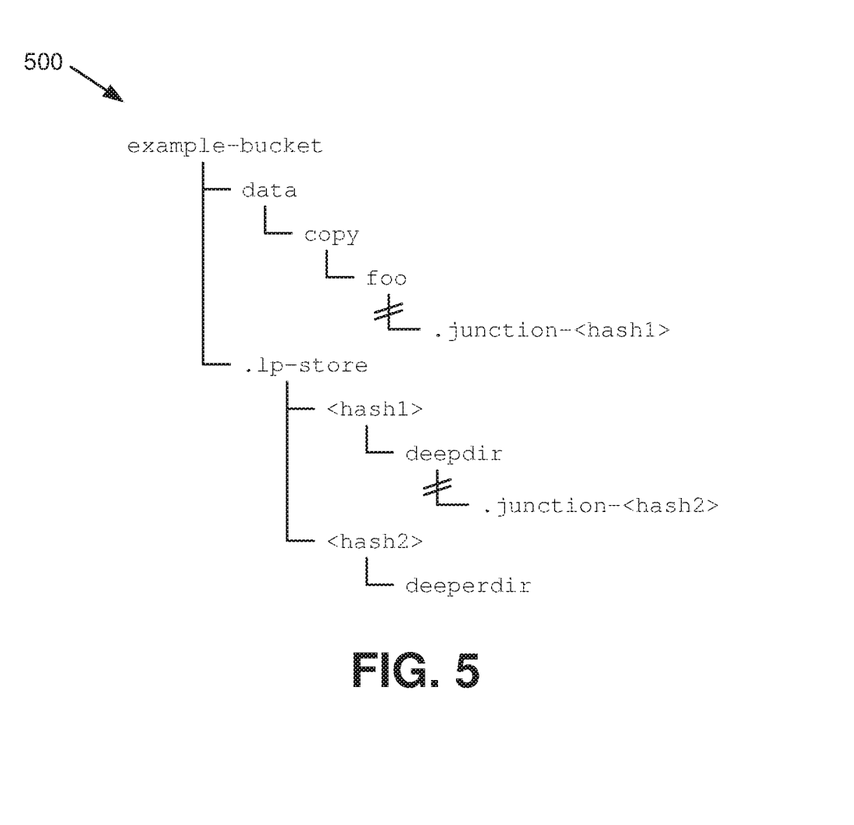

As further shown by diagram 400 in FIG. 4, in the event that a directory path associated with a continuation from a junction point results in the object name length threshold again being exceeded, the junction point component 120 can facilitate the use of additional junction points as appropriate. In the example shown by diagram 400, the directory deepdir can in turn have multiple subdirectories, here ending with a directory deeperdir. Similar to the junction point for deepdir as described above with respect to FIG. 3, if the length of the path .lp-store/<hash1>/deepdir/ . . . /deeperdir exceeds the object name length threshold, a second junction point can be created for deeperdir under .lp-store as shown by diagram 500 in FIG. 5. Similar to the first junction point, the second junction point can be created and assigned a name .junction-<hash2> that includes a redirect indicator and a hash of the full path name associated with deeperdir, here .lp-store/<hash1>/deepdir/ . . . /deeperdir. Subsequently, the directory path associated with deeperdir could further branch from .lp-store/<hash2>, and additional junction points could be created as appropriate.

Figure 6:
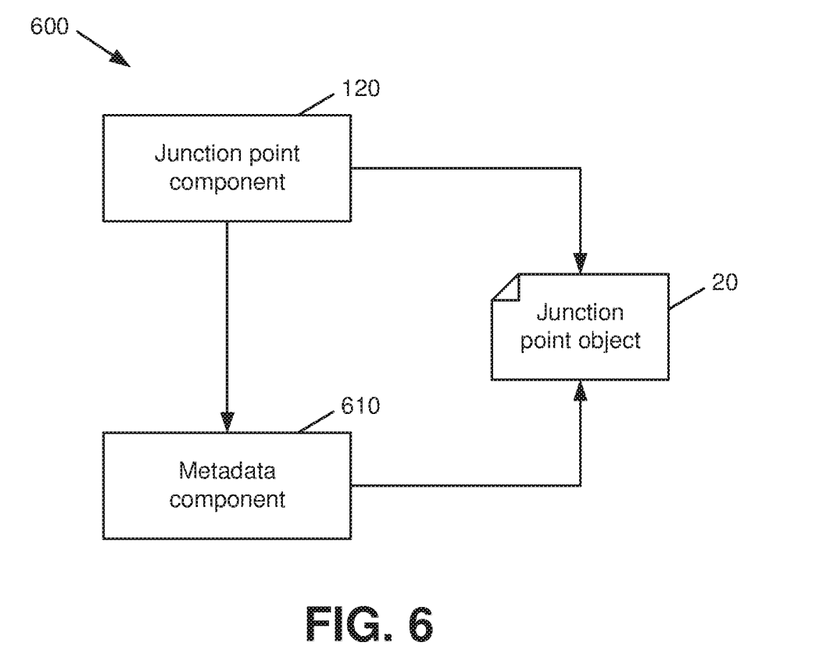
FIG. 6 is a block diagram of a system that facilitates metadata assignment for a junction point object in accordance with various aspects described herein.

With reference next to FIG. 6, a block diagram of a system 600 that facilitates metadata assignment for a junction point object 20 in accordance with various aspects described herein is illustrated. Repetitive description of like elements employed in other embodiments described herein is omitted for brevity. As shown by FIG. 6, system 600 includes a metadata component 610 that can associate metadata with a junction point object 20 that indicates the junction point object 20 as a redirection object for an associated directory path, e.g., as described above with respect to FIGS. 2-5.

In an aspect, the metadata component 610 can identify an object as a junction point by setting a bit, flag, and/or other indication in a metadata field for the object. Also or alternatively, the metadata component 610 can apply other metadata fields to junction points and/or other objects, such as a global file identifier, an object attribute field, a filename corresponding to the object (e.g., if it is altered due to length, as will be discussed below with respect to FIG. 7), and/or any other suitable fields. In a further aspect, object metadata as assigned by the metadata component 610 can facilitate browsing of an object store, e.g., via third-party plugins or tools and/or by other means, in a similar manner to that of the file structure underlying the objects in the object store.

Figure 7:
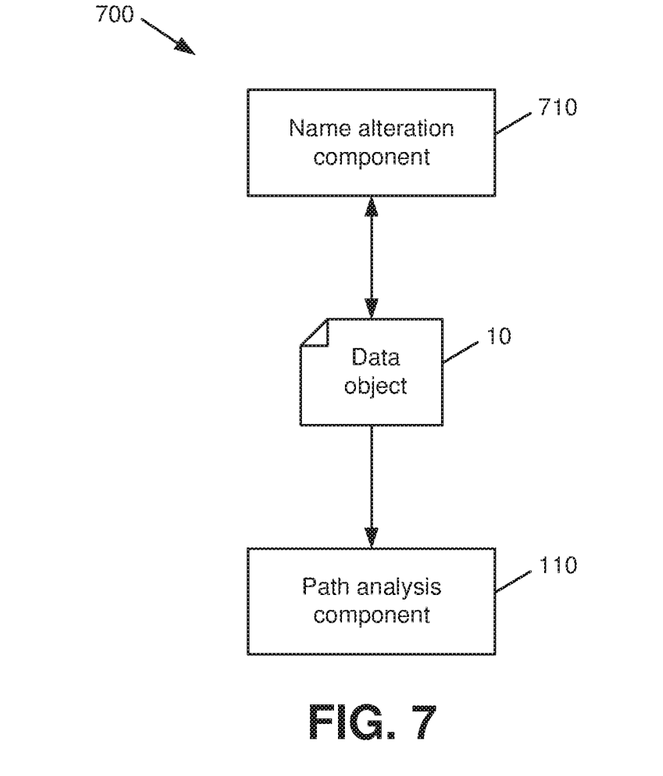
FIG. 7 is a block diagram of a system that facilitates object name alteration for a data object based on a filename associated with the data object in accordance with various aspects described herein.

Turning now to FIG. 7, a block diagram of a system 700 that facilitates object name alteration for a data object 10 based on a file name associated with the data object 10 in accordance with various aspects described herein is illustrated. Repetitive description of like elements employed in other embodiments described herein is omitted for brevity. As described above, a data object 10 can be associated with a file within a directory structure, and the name of the data object 10 can include a filename of the corresponding file. For example, as shown by diagram 200 in FIG. 2, the file FileA.txt can be incorporated into the object key or name for its corresponding data object 10, e.g., data/copy/foo/ . . . /deepdir/FileA.txt.

In an aspect, in the event that the length of a filename associated with a given data object 10 is larger than a filename length threshold, a name alteration component 710 as shown in system 700 can be used to alter the filename as present in the object name or key for the data object 10 by replacing at least a portion of the filename as present in the name or key of the data object 10 with a representation of the filename, e.g., a hash of the filename and/or another suitable representation. Upon alteration of the filename as present in the name/key of the data object 10, the data object 10 can further be provided to the path reference component 130 for further processing, e.g., as described above with respect to FIG. 1.

Figure 8:
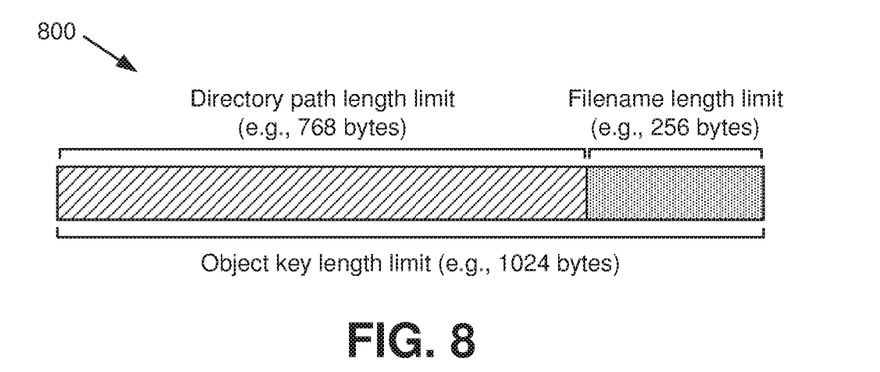
FIG. 8 is a diagram illustrating example name length limits that can be associated with an object in an object storage system in accordance with various aspects described herein.

An example relationship between a filename component length limit and an overall object key limit is illustrated by diagram 800 in FIG. 8. As shown by diagram 800, a filename component within an object key can have a maximum length (e.g. 256 bytes and/or another suitable amount) that is less than the overall length limit for the object key (e.g., 1024 bytes and/or another suitable amount). As further shown by diagram 800, the remaining length provided for an object key can be allocated to directory path components associated with a data object, e.g., as described above. While the directory path length limit and the filename length limit shown in diagram 800 have fixed values, it should be appreciated that these values could change dynamically from object to object. For instance, in the event that a filename component of an object key is less than the allocated maximum, the directory path for the object could in some circumstances be allocated at least a portion of the filename length limit in addition to the directory path limit. It should further be appreciated that the number of bytes associated with object key length limits as shown in diagram 800 does not necessarily correlate to a number of characters associated with the object key since a single written character can occupy more than one byte depending on encoding.

Returning to FIG. 7, the name alteration component 710 can enable the use of arbitrarily long filenames while adhering to filename component length limits (e.g., as illustrated by FIG. 8) through a process referred to herein as "mangling." In an aspect, the name alteration component 710 can employ mangling as described herein to provide an abbreviated representation of a filename while avoiding naming collisions. More particularly, the name alteration component 710 can alter a filename exceeding a given filename length limit by combining a portion of the filename, e.g., a group of the first characters of the filename, with a representation of the original file name, such as a hash (e.g., SHA-224, SHA-256, etc.) of the filename. In an aspect, this process as performed by the name alteration component can further ensure that the resulting altered file name does not exceed the filename length limit. A pseudocode example of mangling that can be performed by the name alteration component for a filename length limit of 256 bytes is provided in Table 2 below.

TABLE 2

Mangling procedure for an example long filename.

fn_before_mangling = "name-longer-than-256-bytes-...";
  -- "..." represents characters exceeding length limit
Fn_after_mangling = "name-longer-than:<filename-hash>";
  -- <filename_hash> = hash of fn_before_mangling
assert(strlen(fn_after_mangling) <= 256);

To ensure that the original filename is fully restored on copying the data object 10 back to file format, the original filename can be stored in metadata for the data object 10 (e.g., by the metadata component 610). If the original filename would cause a metadata length limit for the data object 10 to be exceeded, the original filename can instead be saved in a separate metadata object (e.g., again by the metadata component 610), and a reference to the metadata object can be placed in the metadata for the data object 10 instead of the full original filename.

In an aspect, the name alteration component 710 can be configured to avoid filename collisions associated with the above mangling process by recalculating a hash for a given filename on the resulting filename until the collision is avoided. A pseudocode example of this process is shown by Table 3 below.

TABLE 3

Rehashing procedure for an example long filename.

(1) orig__very__long__filename =>
(2) orig__very__<sha224 of (1)> => collision =>
(3) orig__very__<sha224 of (2)> => no collision => (3) is used In an aspect, junction point objects 20 as generated via the junction point component 120 described above with respect to FIG. 1, along with filename alteration as performed via the name alteration component 710 as described above with respect to FIG. 7, can be utilized together to enable presentation of a practically unlimited namespace for object storage systems, while at the same time keeping a replicated file system in an object storage system browsable with no or minor modifications to third-party object store browsing tools. Further, various aspects provided herein enable enhanced browsability for a replicated file system as compared to a system that naively names objects after corresponding file paths, since even a small number (e.g., 2) of path components could exceed object key length limits.

Figure 9:
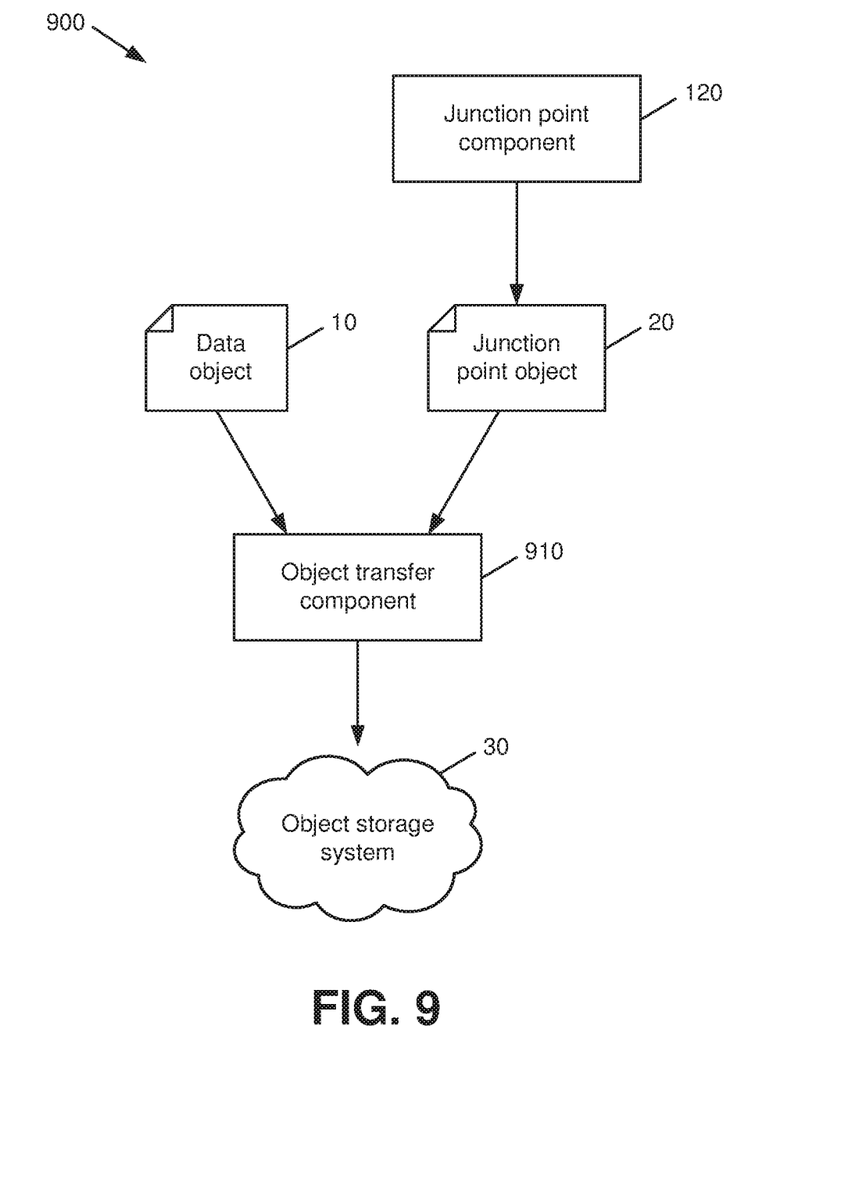
FIG. 9 is a block diagram of a system that facilitates transferal of respective data objects to an object storage system in accordance with various aspects described herein.

Turning to FIG. 9, a block diagram of a system 900 that facilitates transferal of respective data objects 10 to an object storage system 30 in accordance with various aspects described herein is illustrated. Repetitive description of like elements employed in other embodiments described herein is omitted for brevity. As shown in FIG. 9, system 900 can include an object transfer component 910 that can provide respective data objects associated with a replicated file system, such as one or more data objects 10 and one or more junction point objects 20 created by a junction point component 120, to an object storage system 30 that is distinct from a data storage system from which the replicated file system originated. For instance, the object transfer component 910 can facilitate movement of a dataset that includes respective objects from a network attached storage (NAS) platform to a cloud object repository. Other source and/or target system types could also be supported by the object transfer component 910. In an aspect, respective data objects 10 and/or junction point objects 20 can be created on a system associated with the object transfer component 910 and transferred to the object storage system. Also or alternatively, data corresponding to the respective data objects 10 can be provided to the object storage system 30 in file format, and the object transfer component 910 can collect information (e.g., junction point information, altered file names, etc.) relating to object representations for respective files and provide this information to the object storage system 30 to facilitate a conversion of the dataset to object format at the object storage system 30. Other techniques could also be used.

Figure 10:
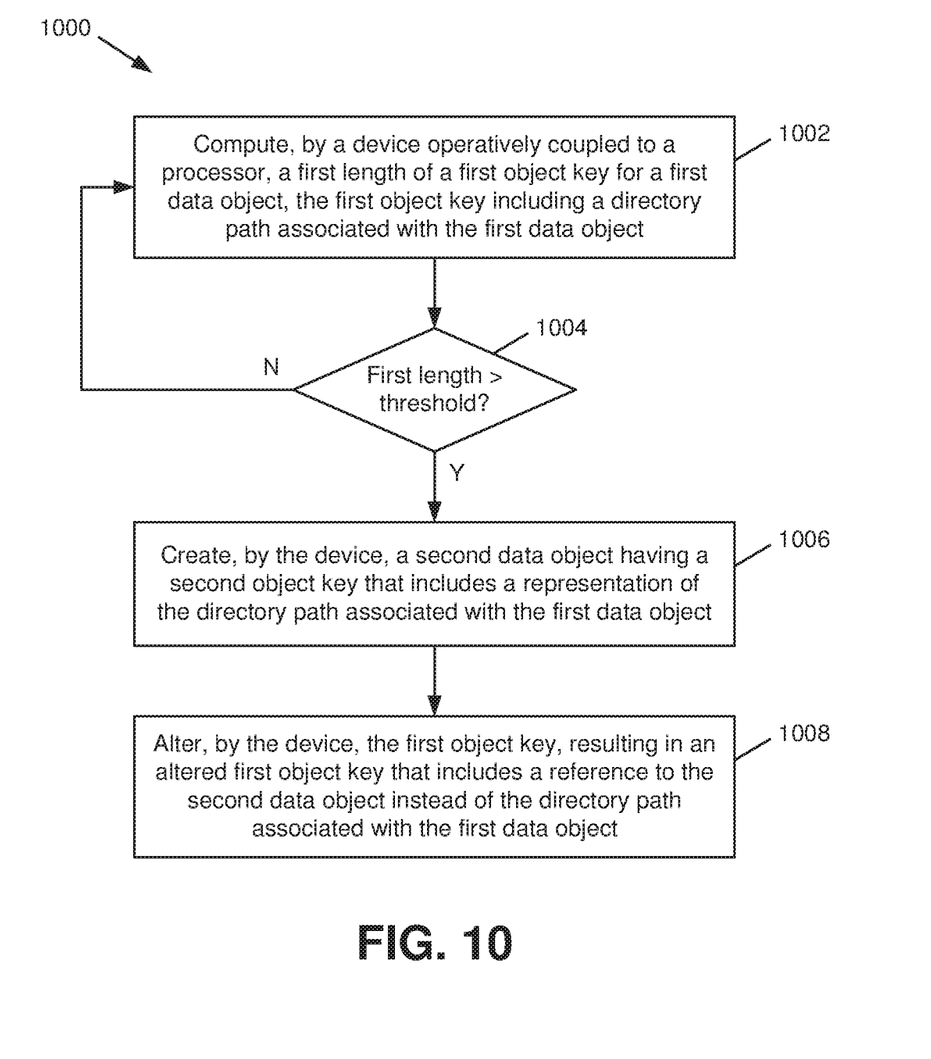
FIGS. 10-11 are flow diagrams of respective methods that facilitate namespace representation and enhanced browsability for replicated file systems in accordance with various aspects described herein.

Referring next to FIG. 10, a flow diagram of a method 1000 that facilitates namespace representation and enhanced browsability for replicated file systems in accordance with various aspects described herein is illustrated. At 1002, a device operatively coupled to a processor can compute (e.g., by a path analysis component 110) a first length of a first object key that is associated with a first data object (e.g., a data object 10). In an aspect, the first object name can include a directory path that is associated with the first data object.

At 1004, the device can determine (e.g., by the path analysis component 110) whether the first length of the first object key provided at 1002 exceeds a threshold (e.g., an object key length limit imposed by an associated object storage system 30). If the first length of the first object key does not exceed the threshold, method 1000 can return to 1002 for processing of additional objects. In contrast, if the first length of the first object key provided at 1002 does exceed the threshold, method 1000 can instead continue to 1006.

At 1006, the device can create (e.g., by a junction point component 120) a second data object (e.g., a junction point object 20) that has a second object key that includes a representation (e.g., a hash, etc.) of the directory path associated with the first data object.

At 1008, the device can alter (e.g., by a path reference component 130) the first object name, resulting in an altered first object name that includes a reference to the second data object (e.g., the hash or other representation of the directory path as created for the second data object at 1006) instead of the full directory path associated with the first data object.

Figure 11:
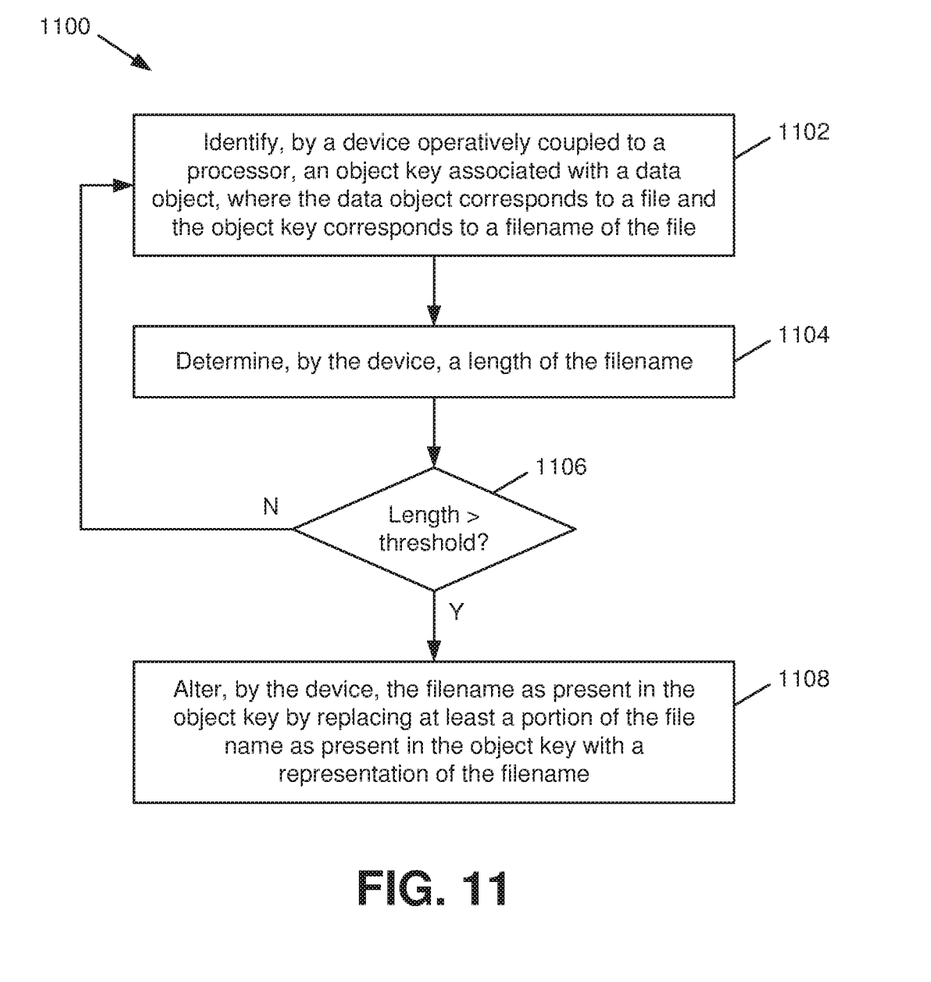

Turning now to FIG. 11, another flow diagram of a method 1100 that facilitates namespace representation and enhanced browsability for replicated file systems in accordance with various aspects described herein is illustrated. At 1102, a device operatively coupled to a processor can identify (e.g., by a path analysis component 110 and/or a name alteration component 710) an object key associated with a data object (e.g., a data object 10). In an aspect, the data object can correspond to a file, and the object key can correspond to a filename of the file.

At 1104, the device can determine (e.g., by the path analysis component 110 and/or the name alteration component 710) a length of the filename corresponding to the object key identified at 1102.

At 1106, the device can determine (e.g., by the name alteration component 710) whether the length of the filename as determined at 1104 exceeds a threshold (e.g., a filename component length limit imposed by an associated object storage system 30). If the length of the filename does not exceed the threshold, method 1100 can return to 1102 for processing of additional object keys. Otherwise, if the length of the filename does exceed the threshold, method 1100 can instead conclude at 1108.

At 1108, the device can alter (e.g., by the name alteration component 710) the filename as present in the object key identified at 1102 by replacing at least a portion of the filename as present in the object name with a representation (e.g., a hash, etc.) of the filename, e.g., via mangling as described above with respect to FIG. 7.

FIGS. 10-11 as described above illustrate methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 12:
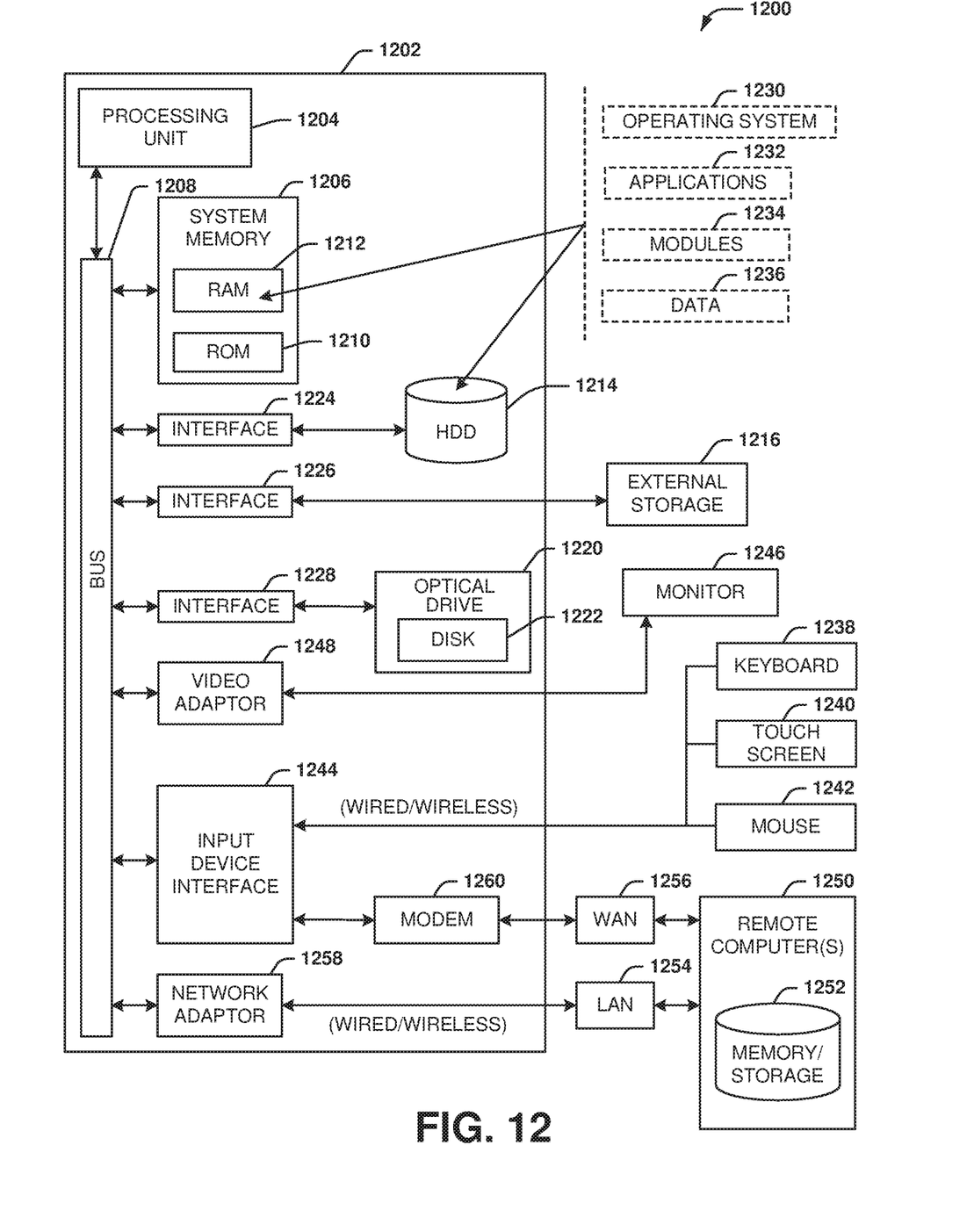
FIG. 12 is a diagram of an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD), a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
a memory that stores executable components; and
a processor that executes the executable components stored in the memory, wherein the executable components comprise:
a path analysis component that determines a first length of a first object name associated with a first data object, the first object name comprising a directory path associated with the first data object;
a junction point component that, in response to determining that the first length is larger than a length threshold, generates a second data object as a new data object having a same object structure as the first data object, wherein the second data object is generated with a second object name that comprises a representation of the directory path associated with the first data object, and wherein the second object name has a second length that is less than the first length; and
a path reference component that alters the first object name in response to the junction point component generating the second data object, resulting in an altered first object name that comprises a reference to the second data object instead of the directory path associated with the first data object.

2. The data storage system of claim 1, wherein the representation of the directory path is a cryptographic hash of the directory path.

3. The data storage system of claim 2, wherein the second object name comprises a redirect indicator and the cryptographic hash of the directory path, and wherein the reference to the second data object in the altered first object name comprises the cryptographic hash of the directory path.

4. The data storage system of claim 1, wherein the executable components further comprise:
a metadata component that associates metadata with the second data object, the metadata indicating the second data object as a redirection object for the directory path associated with the first data object.

5. The data storage system of claim 1, wherein the directory path is a first directory path, and wherein the path reference component further identifies a third data object being associated with a second directory path that includes the first directory path and alters a third object name associated with the third data object, resulting in an altered third object name that comprises the reference to the second data object instead of the first directory path.

6. The data storage system of claim 1, wherein the first data object corresponds to a file stored on the data storage system, and wherein the first object name comprises a filename of the file.

7. The data storage system of claim 6, wherein the length threshold is an object name length threshold, wherein the representation is a first representation, and wherein the executable components further comprise:
a name alteration component that, in response to determining that a third length of the filename is larger than a filename length threshold, alters the filename as present in the first object name by replacing at least a portion of the filename as present in the first object name with a second representation of the filename.

8. The data storage system of claim 7, wherein the representation of the filename comprises a cryptographic hash of the filename.

9. The data storage system of claim 1, wherein the executable components further comprise:
an object transfer component that provides the first data object and the second data object to an object storage system that is distinct from the data storage system.

10. The data storage system of claim 9, wherein the length threshold is an object name length limit associated with the object storage system.

11. A method, comprising:
computing, by a device operatively coupled to a processor, a first length of a first object key for a first data object, wherein the first object key comprises a directory path associated with the first data object;
in response to determining that the first length is larger than a threshold, creating, by the device, a second data object as a new data object having a second object key that comprises a representation of the directory path associated with the first data object, wherein the second data object has a same object structure as the first data object; and
altering, by the device, the first object key in response to the creating the second data object, resulting in an altered first object key that comprises a reference to the second data object instead of the directory path associated with the first data object.

12. The method of claim 11, wherein the representation of the directory path is a cryptographic hash of the directory path.

13. The method of claim 12, wherein the second object key comprises a junction point indicator and the cryptographic hash of the directory path, and wherein the reference to the second data object in the altered first object key comprises the cryptographic hash of the directory path.

14. The method of claim 11, wherein the first data object corresponds to a file stored on a file storage system, and wherein the first object key comprises a filename of the file.

15. The method of claim 14, wherein the threshold is a first threshold, wherein the representation is a first representation, and wherein the method further comprises:
in response to determining that a third length of the filename is larger than a second threshold, altering, by the device, the filename as present in the first object key by replacing at least a portion of the filename as present in the first object key with a second representation of the filename.

16. The method of claim 15, wherein the representation of the filename comprises a cryptographic hash of the filename.

17. A non-transitory machine-readable medium comprising computer executable instructions that, when executed by a processor of a data storage system, facilitate performance of operations, the operations comprising:
computing a first length of a first name of a first object associated with the data storage system, wherein the first name comprises a directory path associated with the first object;
in response to determining that the first length is larger than a threshold length, generating a second object as a new object associated with the data storage system, wherein the second object is assigned a second name that comprises a representation of the directory path associated with the first object, and wherein the second object has a same object structure as the first object; and
altering the first name of the first object in response to generating the second object, resulting in an altered first name that comprises a reference to the second object instead of the directory path associated with the first object.

18. The non-transitory machine-readable medium of claim 17, wherein the representation of the directory path is a cryptographic hash of the directory path, wherein the second name of the second object comprises a redirection indicator and the cryptographic hash of the directory path, and wherein the reference to the second object in the altered first name comprises the cryptographic hash of the directory path.

19. The non-transitory machine-readable medium of claim 17, wherein the first object corresponds to a file stored on the data storage system, and wherein the first name of the first object comprises a filename of the file.

20. The non-transitory machine-readable medium of claim 19, wherein the threshold length is a first threshold length, and wherein the operations further comprise:
in response to determining that a third length of the filename is larger than a second threshold length, altering the filename as present in the first name of the first object by replacing at least a portion of the filename in the first name of the first object with a cryptographic hash of the filename.

\* \* \* \* \*